United States Patent [19]

Buck

[11] Patent Number: 4,583,666

[45] Date of Patent: Apr. 22, 1986

[54] CONTAINER ATTACHMENT

[76] Inventor: Donald C. Buck, 2261 Woodward Ave., Lakewood, Ohio 44107

[21] Appl. No.: 597,583

[22] Filed: Apr. 9, 1984

Related U.S. Application Data

[63] Continuation-in-part of Ser. No. 477,152, Mar. 21, 1983, abandoned.

[51] Int. Cl.[4] .......................... B67D 1/16; G01F 11/28

[52] U.S. Cl. .................................... 222/109; 222/424; 222/570; 248/110; 401/125; 220/90; 15/264

[58] Field of Search ............... 222/570, 192, 109, 424; 248/110; 220/90; 15/264; 401/123, 125; D9/447

[56] References Cited

U.S. PATENT DOCUMENTS

| | | | |
|---|---|---|---|
| 332,043 | 12/1885 | Brien . | |
| 413,526 | 10/1889 | Light . | |
| 683,094 | 9/1901 | Woodley . | |
| 692,103 | 1/1902 | Bailey . | |
| 775,526 | 11/1904 | Dunbar | 220/90 |
| 893,469 | 7/1908 | Essmuller . | |
| 1,126,564 | 1/1915 | Purinton . | |
| 1,361,348 | 12/1920 | Pfisterer . | |
| 1,471,712 | 10/1923 | Sohnle . | |
| 1,682,048 | 8/1928 | Levien . | |
| 1,698,403 | 1/1929 | Harris . | |
| 1,734,976 | 11/1929 | McClellan . | |
| 1,965,356 | 7/1934 | Rittenhouse . | |
| 2,004,285 | 6/1935 | Kent et al. . | |
| 2,331,971 | 10/1943 | Gramp . | |
| 2,353,555 | 7/1944 | Gore | 220/90 |
| 2,402,374 | 6/1946 | Corn et al. . | |
| 2,478,291 | 8/1949 | Litwaitis | 220/90 |
| 2,566,877 | 9/1951 | Dunton . | |
| 2,567,326 | 9/1951 | Entsminger . | |
| 2,591,468 | 4/1952 | Rorem . | |
| 2,676,730 | 4/1954 | Hedglon . | |
| 2,736,536 | 2/1956 | Banowitz . | |
| 2,745,570 | 5/1956 | Miller . | |
| 2,748,977 | 6/1956 | Sarchet . | |
| 2,767,891 | 10/1956 | Beadles . | |
| 2,802,609 | 8/1957 | Donovan . | |
| 2,803,374 | 8/1957 | Cash . | |
| 2,807,431 | 9/1957 | McHale . | |
| 2,837,256 | 6/1958 | Daner . | |
| 2,873,052 | 2/1959 | Atherton . | |
| 2,941,692 | 6/1960 | Kappel . | |
| 2,955,722 | 10/1960 | Antonious . | |
| 2,960,257 | 11/1960 | Sasse . | |
| 3,031,112 | 4/1962 | Smith . | |
| 3,061,140 | 10/1962 | Barnes . | |
| 3,168,962 | 2/1965 | Rawlins et al. . | |
| 3,221,955 | 12/1965 | Banaszak et al. . | |
| 3,275,187 | 9/1966 | Lamoureaux | 220/90 |
| 3,309,000 | 3/1967 | Haverstick . | |
| 3,356,266 | 12/1967 | Pinter, Jr. . | |

(List continued on next page.)

*Primary Examiner*—Joseph J. Rolla
*Assistant Examiner*—Andrew Jones
*Attorney, Agent, or Firm*—Watts, Hoffmann, Fisher & Heinke Co.

[57] ABSTRACT

An attachment is disclosed for use on paint cans and the like. An annular rim guard having an outer wall connected to sloping an annular ring fits on an open can. The annular ring covers a lid receiving groove in a can rim. Integral securing members with C-shaped openings removably secure the rim guard to bail bearings of the can. Sealing flanges are integrally fixed to the bottom of the annular ring portion to provide a sealing contact surface. A paintbrush holder receptacle with a brush receiving opening and a drain opening is fixed to the rim guard for maintaining a paintbrush in a substantially upright position. The drain opening at the bottom of the brush holder is positioned over the can opening to allow excess paint from a brush in the holder to drain into the can interior. A permanent grid feature is located across the drain opening to prohibit small width brushes from entering the can interior. A pouring spout is located in an outer wall of the brush holder. Paint guards prevent paint from spilling out during pouring and to add reenforcement between the rim guard and the brush holder. Handle retaining parts integral with the annular rim guard hold a can handle in an upright position or in annular lock-back position toward the brush holder.

20 Claims, 8 Drawing Figures

U.S. PATENT DOCUMENTS 3,366,272 1/1968 Ballmann .
3,372,834 3/1968 Ayotte et al. .
3,400,867 9/1968 Giannone .
3,407,429 10/1968 Di Nardo .
3,463,366 8/1969 Spencer .
3,469,735 9/1969 Burt .
3,555,589 1/1971 Quimby .
3,655,089 4/1972 Tower .
3,688,943 9/1972 Brown .
3,744,671 7/1973 Saunders, Jr. .
3,844,457 10/1974 Smart .
3,850,341 11/1974 Bart .
3,853,249 12/1974 Weir, Jr. et al. .
3,899,107 8/1975 Goal .
3,948,413 4/1976 Gorrell et al. .
3,980,213 9/1976 Ramsay .
3,994,424 11/1976 Koeller .
4,009,802 3/1977 Hayduchok .
4,014,453 3/1977 Tarnacki .
4,101,046 7/1978 Pontillo .
4,203,537 5/1980 McAlister .
4,225,064 9/1980 Wescott .
4,240,568 12/1980 Pool .
4,266,746 5/1981 Klaiber .
4,275,818 6/1981 Church .
4,316,560 2/1982 Carter .
4,436,217 3/1984 Ritter .................................. 248/110

CONTAINER ATTACHMENT

This is a continuation-in-part of application Ser. No. 06/477,152 filed Mar. 21, 1983 under the title Container Attachment, now abandoned.

TECHNICAL FIELD

The present invention relates to a container attachment and more particularly to a novel combination rim guard, brush holder and pouring spout. The present invention also relates to a method of painting from a can equipped with a novel combination rim guard, brush holder and pouring spout attachment.

BACKGROUND ART

It is well known that when painting from a paint can, an accumulation of excess paint can build up in the lid receiving groove formed in the can rim. Such an accumulation can occur when a paintbrush is wiped against the inside lip of the can. Considerable difficulty is also experienced when pouring paint from a paint can. When pouring paint, paint enters the lid receiving groove in substantial quantities and paint tends to run down the side of the can. A build-up of paint in the lid receiving groove is difficult to remove, and if not completely removed when the lid is secured to the top of the can, makes removal of the lid for the next painting operation extremely difficult.

Additionally, when painting from a paint can, the painter has no convenient place to rest the paintbrush except by laying it across the top of the can. Laying of the paintbrush across the can top can cause excess paint to drip down the side of the can, and build-up more paint in the lid receiving groove, permit paint to drip onto the surface supporting the paint can, such as a floor. Paint may also be transferred to the brush handle when the brush is laid across the top of the can because of paint accumulation in or rear the lid receiving groove.

DISCLOSURE OF THE INVENTION

The apparatus of this invention provides a new and improved paint can attachment that is particularly adapted for protecting the paint can rim, providing a means for pouring paint from the can and providing a holder to hold a paintbrush in an upright direction, the holder permitting excess paint from the brush to flow into the interior of the container. The method of the present invention provides a new and improved procedure for painting from a paint can equipped with the attachment.

In the disclosed and preferred embodiment, a container attachment made in accordance with the present invention includes a rim guard that is adapted to fit over a paint can rim and a lid sealing groove defined by that rim. The rim guard has an opening of sufficient dimension to permit access to the interior of the paint can by a paintbrush. The container attachment also includes a brush holding member fixed to the rim guard and extending above the container rim. The brush holding member includes a brush opening and a drain opening. The holder member is adapted to hold a brush in a substantially upright direction. The drain opening is located to permit excess paint from the brush to flow into the interior of the can.

The rim guard is annular in shape with a canted, annular ring portion bounded by inner and outer, depending flanges. Downwardly directed C-shaped integral securing parts extend from the annular rim guard and frictionally engage bail bearings which project from the body of the paint can. When the rim guard is in position, the inner flange sealingly engages the rim to effect a seal. The outer flange is a skirt which surrounds the rim and an upper portion of the can.

The brush holder is a generally rectangularly shaped extension that is fixed to the rim guard and has a brush opening and a drain opening. When the attachment is in use, the drain opening is positioned over the opening of the paint can so that excess paint from a paintbrush placed in the brush holder will flow into the interior of the can.

Integral handle holding parts project from the rim guard and are adapted to retain the paint can bail in an upright direction. These parts are circumferentially spaced from the brush holder so that the bail and brush do not interfere with one another.

Another feature of the present invention is a provision for a pouring spout in the outside wall of the paint brush holder that permits improved flow control during a pouring operation.

Yet another feature of the present invention is a provision for pouring guards spanning between portions of the rim guard and the brush holder. The pouring guards help retain the paint during a pouring operation of paint out through the brush holder to aid in preventing paint spillage. The pouring guards also function as reenforcements between the rim guard and the brush holder to strengthen the brush holder rim guard combination.

Still another feature of the present invention is a provision of both an intermediate and inner flange selectively to function as sealing flanges. When equipped with these two sealings flanges, the same container attachment can be utilized on two different sizes or types of containers. More specifically, it is useable with equal effectiveness either on a conventional metal paint can or on more recently introduced plastic paint cans.

Several advantages are realized by using a container attachment made in accordance with this invention. One advantage is that the lid receiving groove of the paint can is guarded so that paint does not enter the lid receiving groove. A paint brush can be dipped into paint in the can and wiped against the inner extent of the annular ring. Paint that gets on the annular ring portion from wiping then flows back into the container. Another advantage is that a brush holder is provided that permits a paintbrush to be rested in a substantially upright direction and permits excess paint on the paintbrush placed in the holder to drain into the interior of the can. Paint will not get on the paintbrush handle since the handle itself does not enter the brush holder.

A further advantage of an attachment made in accordance with this inventon is that the attachment can be utilized to pour paint from a paint can without having paint accumulate in the lid receiving groove or run down the outside of the paint can. A rim guard, brush holder and pouring spout are all combined in one convenient can attachment thus performing multiple functions which in the past could only partially be accomplished using several attachment devices.

An additional feature of the present invention consists of handle holding parts which project from the rim guard and selectively retain a paint can bail in either an upright direction or in an angular position angled toward the brush holding member. These parts are circumferentially spaced from the brush holder so that bail and brush do not interfere with one another. The advantage of the angular handle position is that it allows a paint can to hang in a position which provides better access to the interior of the paint container.

Another feature provides for a permanent grid portion which is positioned across the drain exiting opening of the brush holding member. One advantage of the permanent grid is that smaller paintbrushes may be rested in a substantially upright position which allows excess paint on the brush to flow into the interior of the can, while prohibiting the brush itself from entering through the drain opening.

Accordingly, an object of this invention is to provide a novel and improved container attachment that guards the lid receiving groove of a paint can, provides a resting place for a paintbrush, that permits excess paint from a brush placed in the holder to flow into the interior of the paint can and permits paint to be poured from the can without entering the lid receiving groove.

Other features and advantages and a fuller understanding of the invention will be appreciated from the following detailed description and the accompanying drawings.

BEST MODE FOR CARRYING OUT THE INVENTION

Figure 1:
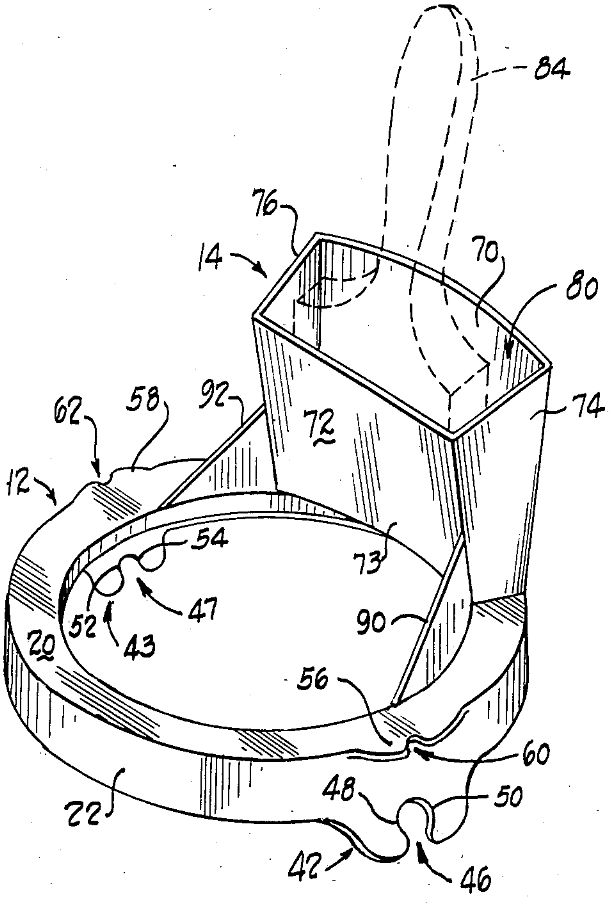
FIG. 1 is a perspective view of a container attachment made in accordance with the present invention.

Referring now to FIGS. 1-4 a container attachment 10 includes a rim guard 12 and a brush holder 14 fixed to the rim guard 12. The rim guard 12 is adapted to fit on the top of a paint can 16 and over a rim 17 to guard a lid receiving groove 18 formed in the rim so that paint will not enter or accumulate in the groove. The brush holder 14 is adaped to hold a paintbrush in a substantially upright direction and to permit excess paint on a brush stored in the holder the flow into the interior of the can.

The rim guard 12 includes an annular ring 20 and a cylindrical outer flange 22. The diameter of the outer flange 22 is larger than the diameter of the paint can 16 such that the rim guard 12 will fit over top of the paint can 16. The outer flange 22 is concentric with the outer wall of the paint can 16. The annular ring 20 has a truncated conical surface which is an axial plane of cross-section inclined with respect to a plane defined by the top opening of the paint can 16. Thus this surface is an inclined drain surface adapted to permit paint that gets on the ring 20 to flow back into the paint can. This canted surface permits a paintbrush to be wiped against the rim guard 12 during a painting operation without the wiped excess paint being lost or collecting in the groove 18.

First inner and intermediate flanges 30, 32 which are sealing flanges integrally extend from the bottom of the annular ring 20. Both sealing flanges are generally V-shaped in cross section. The inner sealing flange 30 depends from near the inside extent of the ring 20 while intermediate flange 32 is between the inner and outer flanges and of intermediate diameter.

A typical metal paint can 16 includes a rim 17, its lid receiving groove 18 and a rolled inner section 40. When the container attachment 10 is placed on an open paint can 16, the first sealing flange 30 sealingly contacts the section 40 of the rim 17. The inclined surface of the annular ring 20 positions the second sealing flange 32 away from the rim 17 such that the second sealing flange has no functional effect on a metal paint can 16.

The outer flange 22 has two integral securing parts 42, 43 spaced 180° apart around the periphery of the container attachment 10. The two securing parts 42, 43 are adapted to frictionally engage the cylindrically extending bail bearings 44 projecting from the body of the paint can 16. The securing parts 42, 43 respectively have generally downwardly directed, generally C-shaped openings 46, 47 forming engagement surfaces 48, 50 and 52, 54 respectively. The engagement surfaces 48, 50 and 52, 54 frictionally engage the bail bearings 44 on the can under securing part deformation force and thus frictionally secure the container attachment 10 to the paint can 16. The hold-down force of the securing parts 42, 43 on the bearings 44 in combination with the contact of the first sealing flange 30 against the inner extent 40 of the lid receiving groove 18, provide sealing engagement between the sealing flange 30 of the container attachment 10 and the paint can 16.

Integral handle retaining portions 56, 58 extend from the rim guard 12 of the container attachment 10, and are aligned with the securing parts 42, 43 respectively. The handle retaining portions 56, 58 respectively include generally U-shaped handle receiving parts 60, 62. The handle retaining portions 56, 58 are adapted to hold and maintain the handle 66 of the paint can in a substantially upright manner with respect to the plane of the can opening.

A brush holding device 14 is fixed to the rim guard 12 with the center of the holding device 14 being positioned approximately 90° from each of the handle retaining portions 56, 58 and the securing parts 42, 43. The brush holder portion 14 is a self draining receptacle which includes an outer wall 70, an inner wall 72 and side walls 74, 76. The outer wall 70 has a cavity 71 located as its lower portion near the ring 20. The cavity reduces the overall material thickness of the outer wall. The inside of the outer wall 70 and the inner wall 72 downwardly converge. The inner wall 72 has a concave portion 73. The brush holder receptacle has a brush opening 80 and a drain opening 82, the drain opening being substantially smaller than the brush opening. The converging outer and inner walls 70, 72 and the side walls 74, 76 hold a paint brush 84 in a substantially upright direction. The portion 73 of the inner wall 72 is concave to accommodate holding of small width brushes. The drain opening 82 is positioned over the opening of the can 16 such that excess fluid in the brush holder 14 will drain or flow into the interior of the container 16. The circumferential spacing of the brush holder and the handle retaining portions are such that the bail and the brush do not interfere with one another.

The handle retaining portions 56, 58 aid in maintaining the can 16 in a substantially upright direction when a brush 84 is placed in the brush holder 14 and the can is picked up. A brush placed in the holder 14 causes an unequal amount of weight to be distributed on one side of the can tending, if the can has been substantially emptied, to cause the can to tip. The handle retaining portions 56, 58 hold the bail substantially upright and function to resist such tipping action.

Because of the annular sealing engagement between the container attachment 10 and the can 16, it is possible to pour paint from the can out through the brush holder 14. Pouring guards 90, 92 are provided to aid in guiding and retaining the paint during the pouring process so that spillage will not occur. The pouring guards 90, 92 are fixed to the side wall 74, 76 at the junction with the interior wall 72. The pouring guards 90, 92 also function as reenforcements beween the rim guard 12 and the brush holder 14 to strengthen the combination. During a pouring operation, the can of paint is tilted, the paint enters the drain opening 82 and is poured out through the brush receiving opening 80.

Figure 5:
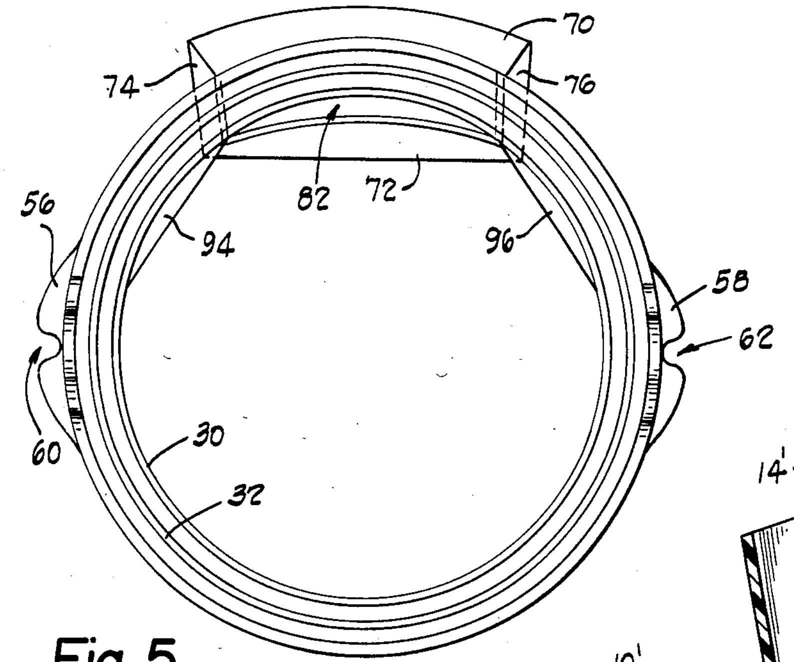
FIG. 5 is a bottom plan view of a container attachment made in accordance with another embodiment of the present invention.

FIG. 5 shows another embodiment of the present invention with a different configuration for pouring guards. Pouring guards 94, 96 are provided which are operatively connected to the annular ring 20 and lie in a plane parallel with the plane of the rim guard 12.

Figure 6:
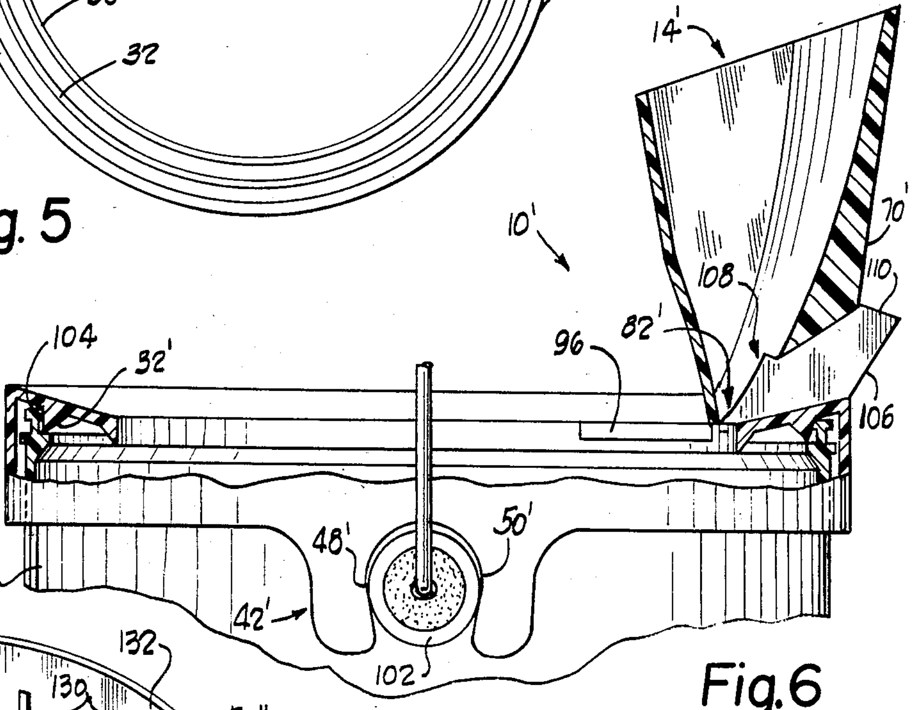
FIG. 6 is an enlarged partial sectional view similar to that shown in FIG. 4 showing a container attachment mounted on another type of container and showing another feature of the present invention.

Referring now to FIG. 6, another feature of the present invention is shown and the function of an intermediate sealing flange will be appreciated. Here an attachment 10' is mounted on a plastic can 100 having cylindrically extending bail bearings 102. The interior rim portion of a plastic paint can 100 is configured differently than a metal paint can rim. A container attachment 10' is removably secured to the plastic container 100 by the securing part 42' by a frictional fit against surfaces 48', 50' with a similar arrangement on the opposite side of the can. The intermediate sealing flange 32' sealingly engages against inner rim surface 104 of the plastic container 100.

The outer wall 70' of the brush holder 14' includes a pouring spout 106 having an input port 108 and an output port 110. During a pouring operation, the container 100 is tilted so that paint enters the drain opening 82', flows through the input port 108 and out the output port 110 of the pouring spout 106. The pouring spout 106 permits the user to pour paint from the container 100 with improved flow control.

Figure 7:
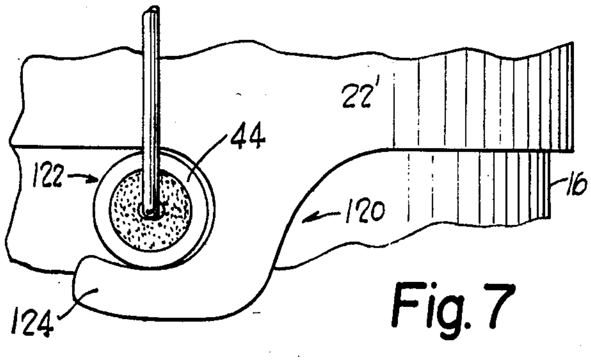
FIG. 7 is an enlarged fragmentary side elevation view showing another embodiment of the present invention mounted on a container; and, FIG. 8 is a fragmentary perspective view with portions broken away to show interior detail of yet another embodiment of the present invention.

Referring now to FIG. 7, an alternative means to secure the container attachment to a paint can is provided. Spaced securing parts 120 each having a reversed, generally C-shaped opening 122 are integrally fixed to the outer flange 22' on opposite sides so as to be able to frictionally engage the cylindrically extending bail bearings of the paint can 16. Each securing part 120 has an arm 124 which in conjunction with the outer flange 22' forms an opening 122. The attachment is positioned on top of an open can with the opening 122 to the side of and aligned with a bail bearing. The attachment is then rotated to engage the bail bearing and to lock it on the can with securing part deformation force.

Figure 8:
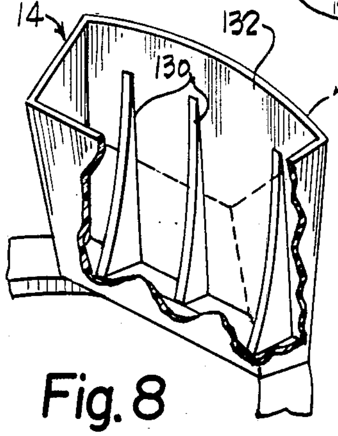

Referring now to FIG. 8 a modified brush holder portion 14" is shown. The outer wall 70" has a plurality of ribs 130 connected to the interior 132 of the outer wall 70". The ribs 130 minimize surface contact with the paintbrush stored in the brush holder 14" and reduces the thickness of the outer wall of the brush holder 14". Reduced thickness is important in manufacture of the container attachment to reduce the quantity of needed material and the amount of time to manufacture the attachment.

The container attachment 10 is preferably made from polypropylene and is made by a process known as injection molding. A reduction of material thickness means a reduction in curing time. The cavity 71 in the outer wall 70 permits a faster curing time during manufacture of the container attachment 70.

In use, the attachment 10 is placed on the top of an open paint can. The sealing flange in combination with the hold-down members seal off the lid receiving groove of the rim when the device is on a metal paint can. The handle 66 of the paint can is snapped into the handle receiving members 56, 58. The attachment is ready to use.

During painting, a painter can dip the brush in the paint and wipe the brush against the inner extent of the rim guard to remove excess. Paint on the canted annular ring 20 will drain back into the can.

When it is desired to rest the brush, the brush is placed in the receptacle 14. Excess paint will drain through the drain opening 82 back into the can.

If one wishes to pour paint, the brush is removed and the can tilted so the paint pours out through the top of the receptacle 14 or the spout 106 if so provided.

Referring again to FIG. 2, the brush holder 14 includes a fixed grid portion 150 which extends across the drain exiting opening 82' of the brush holding receptacle 74. The grid 150 is fixed at the bases of both the outer wall 70 and the inner wall 72. The drain opening 82' is enlarged to allow for increased fluid flow over that shown in my original application and shown in FIGS. 4 and 5 out of and into the interior of the can during the pouring procedure or while a brush drains. The converging outer and inner walls 70, 72 and the side walls 74, 76, selectively hold small and large width brushes substantially upright. The permanent grid portion 150 prohibits the brushes from entering the interior of the container 16 through the enlarged drain opening 82', which is positioned over the opening of the container 16 such that excess fluid in the brush holder will flow or drain into the interior of the can 16.

Figure 2:
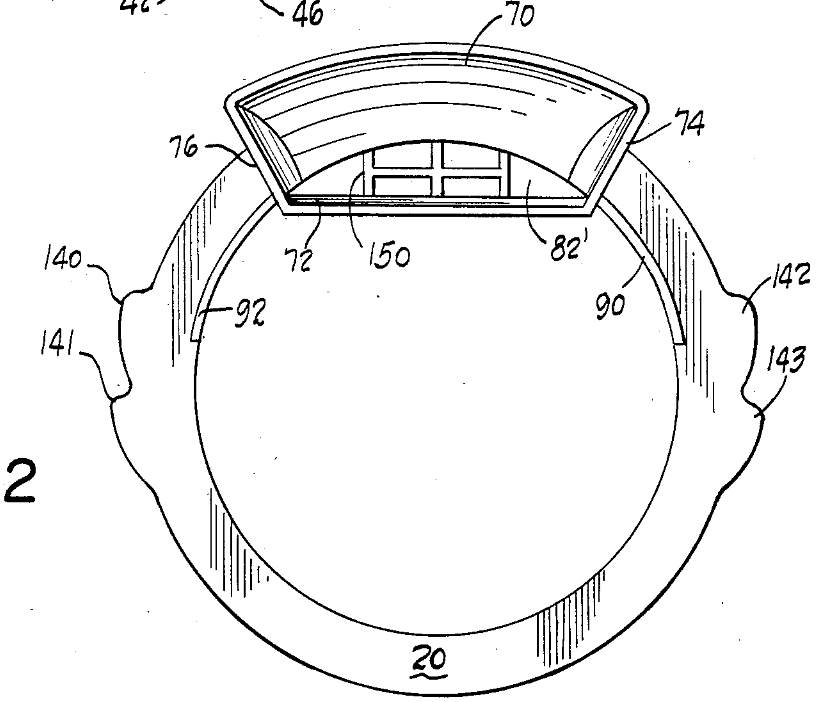
FIG. 2 is a top plan view of the container attachment made in accordance with the present invention.
Figure 3:
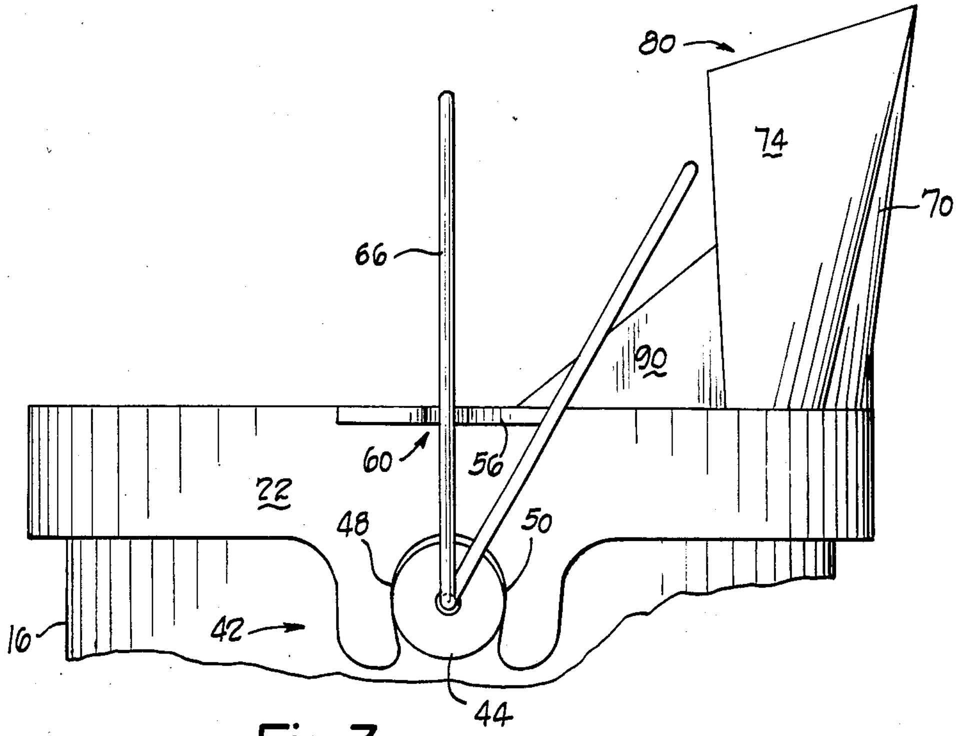
FIG. 3 is an enlarged side elevational view of the container attachment made in accordance with the present invention mounted on a container.
Figure 4:
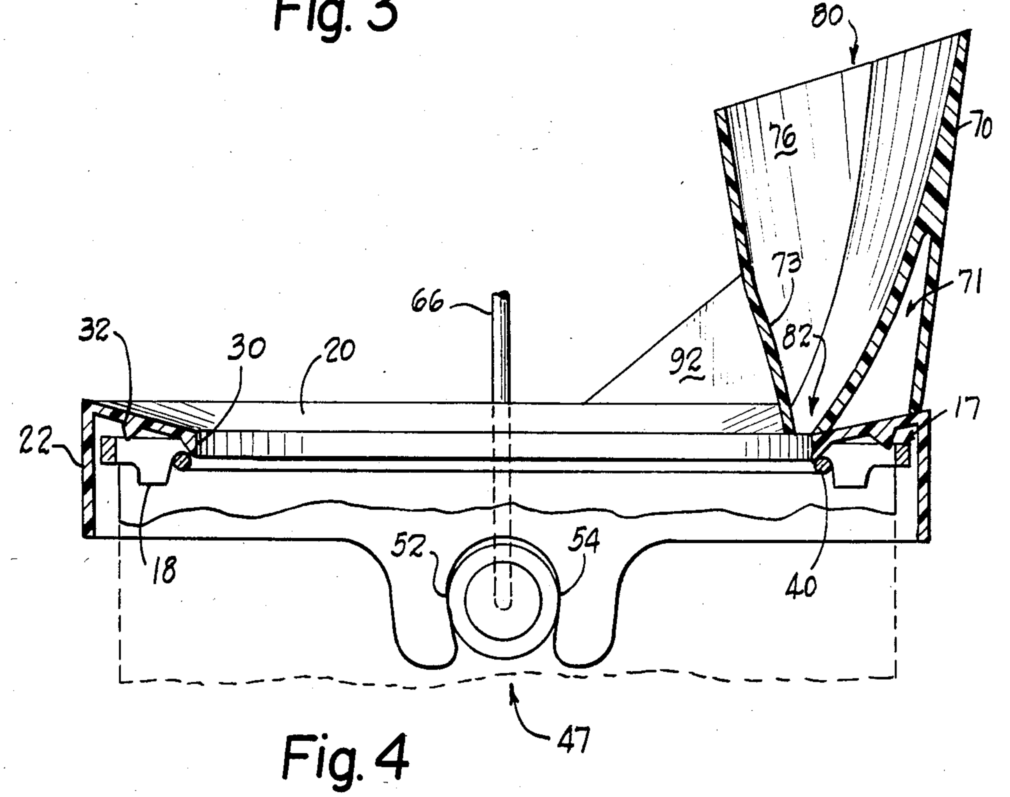
FIG. 4 is a partial sectional view of the container attachment of the present invention mounted on a container as it would be seen from the plane indicated by line 4—4 of FIG. 2.

Additional features of the handle holding portions 140, 141, 142, 143 are shown in FIGS. 2 and 3. The integral handle retaining portions 140, 141, 142, 143 extend from the rim guard 12 of the container attachment 10, and are aligned with the securing parts 42, 43. The handle retaining portions 140, 141, 142, 143 are adapted to hold and maintain the handle 66 of a paint can 16 in a substantially upright manner with respect to the plane of the container opening. Handle holding parts 140, 142 allow the handle to be placed in an angular lock-back position approximately 30° toward the brush holding device and thus at an acute angle with respect to the plane of the can opening.

The handle retaining portions 140, 141, 142, 143 aid in maintaining the substantially upright or angular position of the can 16 when a brush 84 is placed in the brush holder 14 or the can is picked up. The handle lock-back position allows the can to be maintained at an angle such as while suspended from a ladder to allow easier paintbrush access into the interior of the tipped container. In either the upright or angular lock-back positions the handle retaining portions 140, 141, 142, 143 act to resist the tipping action which may occur when the can is picked up or when a brush is placed in the holder of a can which is substantially empty and might otherwise be tipped over by the weight of a brush.

Other modifications and variations of the invention will be apparent to those skilled in the art in view of the foregoing detailed disclosure. Therefore, it is to be understood that, within the scope of the appending claims, the invention can be practiced otherwise than as specifically shown and described.

I claim:

1. A container attachment comprising:

(a) a rim guard member adapted to fit on a container to cover at least part of a rim of the container, said rim guard member having surfaces defining an opening of sufficient dimension to permit access to the interior of said container; and (b) a brush holder member fixed to said rim guard member and extending above the container rim, said brush holding member having a receptacle with a brush opening and a drain opening and adapted to support a brush in a generally upright position and permit excess fluid on said brush to drain from said brush through said drain opening of said receptacle, said drain opening being positioned to allow draining fluid to enter the interior of such a container and being located above the level of fluid in the container when in use whereby liquid from the container may be poured through the drain opening and at least a portion of the holder and an adjacent portion of the rim guard member surfaces connect to function as a pouring spout.

2. The container attachment of claim 1 further comprising securing means to secure said rim guard member to said container.

3. The container attachment of claim 1 further comprising sealing elements fixed to said rim guard member and adapted to engage an interior surface of said container interior.

4. The container attachment of claim 1 further comprising pouring guard elements fixed to said rim guard members and said receptacle of said brush holding member and adapted to aid in preventing spillage of fluid during pouring through said brush holding member, and positioned to reinforce the brush holder and rim guard by supporting and stabilizing the brush holder.

5. The container attachment of claim 1 further comprising handle retaining portions to retain a handle of said container in a substantially upright direction.

6. The container attachment of claim 1 further comprising a plurality of handle holding portions for selectively retaining a bail of a container in a substantially upright direction or in an angular lock-back position closer to the brush holding member.

7. The container attachment of claim 1 further comprising a permanent grid portion positioned at the base of said brush holding member across the drain opening of said receptacle and adapted to allow excess fluid to drain through said grid portion positioned across said drain openings into the interior of a container, while inhibiting smaller brushes from entering the interior of said container through said drain opening.

8. An attachment for use on a paint container or the like comprising;

an annular rim guard having surfaces including an outer wall connected to a ring portion, said outer wall being concentric with the container and being on the exterior of said container, said ring portion covering the rim of said container and being canted so that fluid on said ring portion drains into the interior of said container;

securing means fixed to said outer wall of said annular rim guard for securing said rim guard to said container;

sealing means fixed to a bottom side of said ring portion for engaging an interior portion of said container; and a brush holding member fixed to said ring portion of said annular rim guard, said brush holding member having a receptacle with a brush opening and a drain opening said brush holding member being adapted to support a brush in a generally upright position and positioned to hold a brush at an angle sufficient to permit excess fluid on said brush to drain through said drain opening, said drain opening being located to permit draining fluid to enter the interior of said container, the brush opening being oriented relative to the remainder of the attachment such that when the attachment is in use paint may be poured through the opening and at least a portion of the brush holder and a connecting and adjacent surface of the rim guard are adapted to function as a pouring spout.

9. The attachment of claim 6 further comprising a second sealing means spaced from the first recited sealing means and fixed to the bottom side of said ring portion for engaging an interior portion of a second container having a different dimension than the first recited container.

10. The attachment of claim 6 wherein said securing means are two integral parts of said outer wall, each of said parts having a general downward directed C-shaped opening adapted to engage cylindrically extending bail bearings on the container and to hold said attachment to said container.

11. The attachment of claim 6 further comprising handle holding parts extending from said rim guard and adapted to retain a handle of said container in a substantially upright position with respect to said container.

12. The attachment of claim 6 wherein said sealing means is a generally V-shaped in cross-section sealing flange, the sealing flange wall closest to the rim guard outer wall making sealing contact against an interior portion of the container.

13. The attachment of claim 8 further comprising a plurality of handle holding parts which extend from said rim guard and are adapted to retain a handle of a container selectively either in a substantially upright position with respect to said container opening, or in a lock-back position at an acute angle with respect to said container opening.

14. The attachment of claim 8 further comprising a grid portion fixed at the base of said brush holding member across the drain opening of said receptacle and positioned to allow fluid to drain downward through said grid portion and drain opening into the interior of a container.

15. An attachment for use on a paint can comprising:

an annular rim guard adapted to fit on top of an open paint can, said guard having surfaces including an annular outer wall connected to an annular ring portion, said ring portion covering the rim of the can, said annular outer wall fitting on the outside of said paint can and being substantially concentric with the paint can, said annular ring portion being sloped downward and inward toward the interior of said paint can so that fluid on said annular ring portion drains into the interior of said can;

two securing parts integral with said outer wall and having generally downward directed C-shaped openings adapted to engage cylindrically extending bail bearings on the side of said can to hold said annular rim guard to said can;

handle holding parts integral with said annular rim guard adapted to retain a handle of said can in a substantially upright direction;

an annular, generally V-shaped sealing flange integral with the bottom side of said annular ring portion, said sealing flange engaging an interior rim lip of the paint can; and a brush holder fixed to said annular ring portion of said annular rim guard, said brush holder having spaced apart inner and outer wall portions connected by side walls and defining a brush receiving opening and a drain exiting opening, said brush holder extending above said annular rim guard and adapted to hold a paintbrush in a generally upright manner, said drain opening being positioned to permit paint draining from a paintbrush placed in said holder to drain into the interior of said can and to connect with the surfaces of the rim guard to function as a pouring spout.

16. The attachment of claim 15 further comprising a pouring spout in said outer wall portion of said brush holder to permit paint to be poured from said attachment out through said pouring spout.

17. The attachment of claim 16 further comprising pouring guards fixed to said rim guard to aid in preventing paint from spilling during pouring through said pouring spout.

18. The attachment of claim 15 wherein said inner and outer wall portions of said brush holder converge downwardly toward the interior of the paint can, said brush receiving opening being sufficiently large to permit entrance of a paint brush and said drain exiting opening being sufficiently small to prevent the paint brush from extending through said drain exiting opening.

19. The attachment of claim 15 further comprising handle holding portions integral with said annular rim guard adapted selectively to retain a handle of a container in either a substantially upright position or in an angular lock-back position toward the brush holding member.

20. The attachment of claim 15 further comprising a fixed grid portion consisting of permanent rib elements extending outwardly from the base of said brush holding member, and positioned when in use substantially horizontally across the base of the inner and outer walls of said brush holder which converge downward toward the interior of a container, said brush receiving opening being sufficiently large to permit entrance of a paintbrush and said grid portion being positioned across said drain exiting opening to inhibit smaller width brush exit from the brush holder through said drain opening.

* * * * *